UNITED STATES PATENT OFFICE.

WILLARD E. CASE, OF AUBURN, NEW YORK.

ART OF REGENERATING EXHAUSTED GALVANIC CELLS.

SPECIFICATION forming part of Letters Patent No. 344,346, dated June 29, 1886.

Application filed October 26, 1885. Serial No. 180,962. (Specimens.)

*To all whom it may concern:*

Be it known that I, WILLARD E. CASE, of Auburn, Cayuga county, New York, have invented a new and useful Improvement in the Art of Regenerating Exhausted Galvanic Cells, of which the following is a specification.

In another application for Letters Patent filed simultaneously herewith and serially numbered 180,963, I have fully described and claimed a new and useful improvement in the art of converting heat energy into electrical energy. In still another application, also filed simultaneously herewith, and serially numbered 180,961, I have fully described my new apparatus wherein said conversion is effected. The subject-matter of both of the aforesaid applications is herein disclaimed.

My present invention relates to a new process for the regeneration of spent or exhausted galvanic cells. By "exhausted galvanic cell" I mean an apparatus originally containing two separate bodies of conducting material and a liquid in which the chemical affinity between the liquid and that one of said conducting bodies which is normally capable of being attacked thereby is satisfied, when no further development of chemical energy in the cell can occur, and hence no electrical current can be produced. My process, however, relates more particularly to the regeneration of my apparatus for converting heat energy into electrical energy, which apparatus is caused to act like a galvanic cell by the application and maintenance of heat, and subsequently becomes run down or exhausted by the satisfaction of the chemical affinities set in action by the heat. Thus, to illustrate, my apparatus may consist of a liquid containing chromic chloride and two conducting-bodies—one of carbon, the other of tin. If these bodies be connected in circuit as electrodes with the apparatus at normal temperature, no current is yielded. If, however, heat be applied to the liquid, raising the same to a temperature not exceeding 212° Fahrenheit, and maintaining said temperature between 212° and a certain limit below the same, then the apparatus will yield a current. Apparently the chromic chloride becomes decomposed in the presence of the tin and yields free chlorine, which at once attacks the tin, developing chemical energy, which results in the production of an electrical current and tin protochloride. When all the tin has thus been combined, the temperature of the apparatus remaining within certain limits, the cell yields no further current, and the liquid then contains chromium protochloride and tin protochloride. The lifetime of the cell is now apparently ended. I have discovered, however, that in order to regenerate the liquid it is necessary simply to abstract heat from it—that is, to reduce it down to normal temperature. The tin is then precipitated from the protochloride and the free chlorine combines with the chromium protochloride, producing chromic chloride. The tin deposited may be received upon the bottom of the cell, and so may make contact with a suitable terminal of conducting material there placed. The apparatus is now brought back to what I term the "potential" state. If heat be again applied to it, chlorine is liberated from the liquid as before, attacks the deposited tin, which thus becomes an electrode, and a current is produced, as before, in a circuit including the tin, the carbon, and the liquid. It will be apparent, therefore, that by the supply of heat and maintenance thereof I may convert my apparatus into a generator of electricity. When, however, the chemical affinities set free by the heat are satisfied, then it is no longer such a generator. It is then substantially in the condition of a zinc carbon sulphuric-acid cell in which all the zinc has been converted into zinc sulphate. It has developed all the energy due to the bringing together of the elements capable of chemical reaction. Supposing, now, the apparatus to be thrown aside as used up, it is obvious, other things being equal, that it will have accomplished useful results, equally useful in character to those of any ordinary galvanic battery.

The importance of my present invention becomes apparent, when, instead of thus putting aside the apparatus, it is found possible to reduce it back to a condition of useful potentiality simply by abstracting a certain amount of heat from it, and this without in any wise adding to, taking from, or directly changing (save in so far as the abstraction of heat changes them) the substances employed. The apparatus in the aforesaid condition is inert. It is not even in the potential state which it was before any heat was applied to it. Now, the abstraction of heat produces no current, although, like the addition of heat, the abstraction thereof liberates new elements having an affinity for each other; but while the addition of heat liberates an element to the apparatus in potential state which will attack and combine with an electrode, so producing a current, the abstraction of heat from the apparatus in the inert state frees the electrode from the combination, and allows the previously-liberated attacking elements to go back to its original combination. This is what I mean by the term "regenerate" herein. Hence the abstraction of heat is not a mere reversal of the application of heat, because while the latter carries the apparatus from a potential state to a kinetic state the former carries it from a state which is neither kinetic nor potential, but inert, to a potential state.

I claim—

The process of regenerating a spent or exhausted galvanic cell in which electricity has been generated by the action of heat on the contents of said cell, which consists in abstracting heat from the liquid in said cell.

WILLARD E. CASE.

Witnesses:
PARKER BENJAMIN,
W. E. DORAN.